(12) United States Patent
Yoshida

(10) Patent No.: US 6,468,685 B1
(45) Date of Patent: Oct. 22, 2002

(54) SEPARATOR FOR A FUEL CELL

(75) Inventor: Tsunemori Yoshida, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 21 days.

(21) Appl. No.: 09/685,093

(22) Filed: Oct. 11, 2000

(30) Foreign Application Priority Data

Jan. 11, 2000 (JP) ........................................ 2000-002383

(51) Int. Cl.⁷ ................................................ H01M 2/00
(52) U.S. Cl. .............................. 429/34; 429/41; 429/38
(58) Field of Search ............................... 429/34, 41, 38

(56) References Cited

U.S. PATENT DOCUMENTS

| | | | | |
|---|---|---|---|---|
| 4,737,421 A | * | 4/1988 | Uemura et al. | 429/34 |
| 6,180,275 B1 | * | 1/2001 | Braun et al. | 429/34 |
| 6,242,124 B1 | * | 6/2001 | Saito et al. | 429/38 |

FOREIGN PATENT DOCUMENTS

JP         56-138876    * 10/1981

* cited by examiner

Primary Examiner—Laura Weiner
(74) Attorney, Agent, or Firm—Jones, Tullar & Cooper, P.C.

(57) ABSTRACT

In a separator for a fuel cell according to the invention, a separator is formed by a molding a bondcarbon compound in which a composition ratio of graphite powder is set to 60 to 90%, and a composition ratio of a thermosetting resin is set to 10 to 40%, and at least a top end face of each of a number of ribs contacting the surface of an anode or a cathode is coated with a conductive film made of a material which is lower in specific resistance than the bondcarbon compound. According to this configuration, while excellent moldability and high productivity are ensured by the use of the bondcarbon compound containing a larger content of a resin, the contact resistance with respect to an electrode is lowered so that the conductivity of the whole can be improved, and predetermined performance of a fuel cell can be surely exerted.

8 Claims, 4 Drawing Sheets

SEPARATOR FOR A FUEL CELL

BACKGROUND OF THE INVENTION

1. Field of the Invention

The present invention relates to a separator for a fuel cell which is mainly used as a cell for an electric vehicle, and more particularly to a separator for a fuel cell of the electrolyte type in which a unit cell that is a unit constituting the cell is configured by: sandwiching a gas diffusion electrode having a sandwich structure wherein an electrolyte membrane configured by an ion exchange membrane is interposed between electrodes (an anode and a cathode); and forming fuel gas passages for a fuel gas containing hydrogen and oxidant gas passages for an oxidant gas containing oxygen between the separators, and the electrodes of both the sides.

2. Description of the Prior Art

In a fuel cell, a fuel gas and an oxidant gas are respectively supplied to an anode and a cathode, so that, in the anode and the cathode, electrochemical reactions indicated by the formulae:

$$H_2 \rightarrow 2H^+ + 2e^- \quad (1)$$

$$(\tfrac{1}{2})O_2 + 2H^+ + 2e^- \rightarrow H_2O \quad (2)$$

occur, and, in the whole of the cell, an electrochemical reaction indicated by the formula:

$$H_2 + (\tfrac{1}{2})O_2 \rightarrow H_2O \quad (3)$$

proceeds. The chemical energy due to the chemical reaction is converted into electrical energy, with the result that the cell can expect a predetermined performance.

A separator for a fuel cell of the electrolyte type in which such energy conversion is conducted is desirably gas-impermeable, and also is made of a material of high electrical conductivity in order to improve energy conversion efficiency. Conventionally, as a material meeting the requirements, a complex which is configured by mixing graphite (carbon) powder with a thermosetting resin such as phenol resin, or a so-called bondcarbon (resin-bonded carbon) compound is used, and a separator for a fuel cell is configured by forming such a bondcarbon compound into a predetermined shape.

Conventionally, a separator for a fuel cell having a predetermined shape is formed by using such a bondcarbon compound in the following manner. With respect to the composition ratio of a thermosetting resin such as phenol resin and graphite powder, a bondcarbon compound in which the content of the thermosetting resin is increased is used placing emphasis on moldability. In the case of injection molding which is molding means having good productivity, for example, a bondcarbon compound in which the content of a thermosetting. resin is set to about 40% or more is used.

In a conventional separator for a fuel cell molded by using a bondcarbon compound in which the composition ratio of a resin is large as described above, moldability is excellent because the bondcarbon compound is excellent in fluidity, but the content of a thermosetting resin serving as an electrically insulating material is large, and hence the specific resistance of the bondcarbon compound itself constituting the separator is raised. In the case where injection molding having good productivity is employed as molding means, particularly, the composition ratio of a thermosetting resin must be set to about 40% or more, and therefore the specific resistance of the bondcarbon compound is largely raised to $1 \times 10^{-1}$ to $1 \, \Omega \cdot cm$. The specific resistance is one of performances of materials constituting a separator. The resistance of a separator is largely affected also by other factors, i.e., the internal resistance and the contact resistance. Among such factors, the contact resistance with respect to an electrode exerts the largest effect. In a separator of the conventional art in which no countermeasure against the above-mentioned phenomenon is taken, therefore, the resistance remains to the large specific resistance of a bondcarbon compound having a large composition ratio of a resin, so that the electrical resistance of a portion which is to be contacted with an electrode is high. This is not preferable from the viewpoint of the performance of a fuel cell.

In order to lower the specific resistance of a bondcarbon compound itself serving as a material constituting a separator so as to improve the conductivity of a separator for a fuel cell, it may be contemplated that the content of a thermosetting resin is reduced. When a bondcarbon compound in which the content of a thermosetting resin is reduced as described above is used, however, elongation and fluidity of the bondcarbon compound during a molding process are lowered to impair the moldability, and easily cause molding unevenness. As a result, it is impossible to obtain a molded member (separator) which is correct in shape. Furthermore, height uniformity and flatness of an end face contacting with an electrode are largely affected by the accuracy of a molding die. Even when the specific resistance of the bondcarbon compound itself is lowered, therefore, the contact resistance with respect to an electrode is high, and hence it is difficult to sufficiently improve the conductivity of a separator.

Because of the above-discussed reasons, in a separator for a fuel cell of the conventional art, a bondcarbon compound in which the composition ratio of a resin is large is usually employed as described above with placing the primary emphasis on moldability. As a result, the specific resistance of a bondcarbon compound itself is high, and the contact resistance with respect to an electrode which largely affects the performance of a fuel cell is inevitably raised, so that the problem of reduced conductivity is unavoidably produced.

SUMMARY OF THE INVENTION

The present invention has been conducted in view of the above-mentioned situations. It is an object of the invention to provide a separator for a fuel cell in which, while excellent moldability is ensured by using a bondcarbon compound of a large resin content, the contact resistance with respect to an electrode can be lowered so that the conductivity of the whole can be improved.

It is another object of the invention to enhance flatness of an end face contacting with an electrode without being affected by the molding accuracy of the whole of a separator, whereby the contact resistance with respect to an electrode can be sufficiently lowered.

It is a further object of the invention to lower the contact resistance with respect to an electrode and, at the same time, enhance the bending elasticity of a separator, so that also damage, such as crack due to vibrations, can be prevented from occurring.

In order to attain the objects, the separator for a fuel cell of the invention is a separator for a fuel cell of an electrolyte type consisting of a complex which is configured by mixing graphite powder with a thermosetting resin, and characterized in that, in the complex, a composition ratio of the graphite powder is set to 60 to 90%, and a composition ratio of the thermosetting resin is set to 10 to 40%, and at least an end face, contacting an electrode, is coated with a conductive film made of a material which is lower in specific resistance than the complex.

According to the invention having the above-mentioned characteristic configuration, a bondcarbon compound of a complex in which the composition ratio of the thermosetting resin is set to be large or 10 to 40% is used, and hence elongation and fluidity during a molding process are improved so that, even when injection molding means having good productivity is employed, a molded member (separator) of a desired shape can be surely obtained. While ensuring such excellent moldability, the contact resistance between the molded member and an electrode which is affected at the highest degree by the increased content of the resin can be greatly lowered by the presence of the conductive film with which the end face contacting with the electrode is coated. Therefore, it is possible to attain an effect that, while improving the productivity by the employment of injection molding means having excellent moldability, the conductivity of the separator as a whole can be remarkably improved and predetermined performance of a fuel cell can be sufficiently exerted.

In the separator for a fuel cell of the invention, the conductive film may be thin or have a thickness of 10μm or smaller, preferably, 3μm or smaller. According to this configuration, the flatness accuracy of the conductive film can be enhanced without being affected by the molding accuracy of the separator itself, so that the actual contact area can be made larger. This cooperates with the low specific resistance of the film itself to reduce the contact resistance with respect to an electrode to an extremely low level.

As a material of the conductive film in the separator for a fuel cell of the invention, any conductive material such as conductive graphite paste, gold paste, or silver paste may be used as far as the conductive material is lower in specific resistance than the bondcarbon compound.

As means for performing coating of the conductive film, any means such as spraying, vapor deposition, printing, or application may be employed as far as a smooth surface is attained and the means exerts excellent adaptability with an electrode.

As the thermosetting resin which is useful in the invention, phenol resin which is excellent in wettability with respect to graphite powder may be most preferably used. Alternatively, any other resin such as polycarbodiimide resin, epoxy resin, furfuryl alcohol resin, urea resin, melamine resin, unsaturated polyester resin, or alkyd resin may be used As the graphite powder which is useful in the invention, powder of graphite of any kind, including natural graphite, artificial graphite, carbon black, kish graphite, and expanded graphite may be used. In consideration of conditions such as cost, the kind of graphite can be arbitrarily selected. In the case where expanded graphite is used, particularly, a layer structure is formed by expanding the volume of the graphite as a result of heating. When molding pressure is applied, layers can twine together to be firmly bonded to one another. Therefore, a complex and hence a separator can be enhanced in bending elasticity so that damage, such as cracks due to vibrations, can be prevented from occurring. Consequently, expanded graphite is most effective.

Other objects and effects of the invention will be clarified in embodiments which will be description below.

PREFERRED EMBODIMENTS OF THE INVENTION

Hereinafter, an embodiment of the invention will be described with reference to the accompanying drawings.

Figure 1:
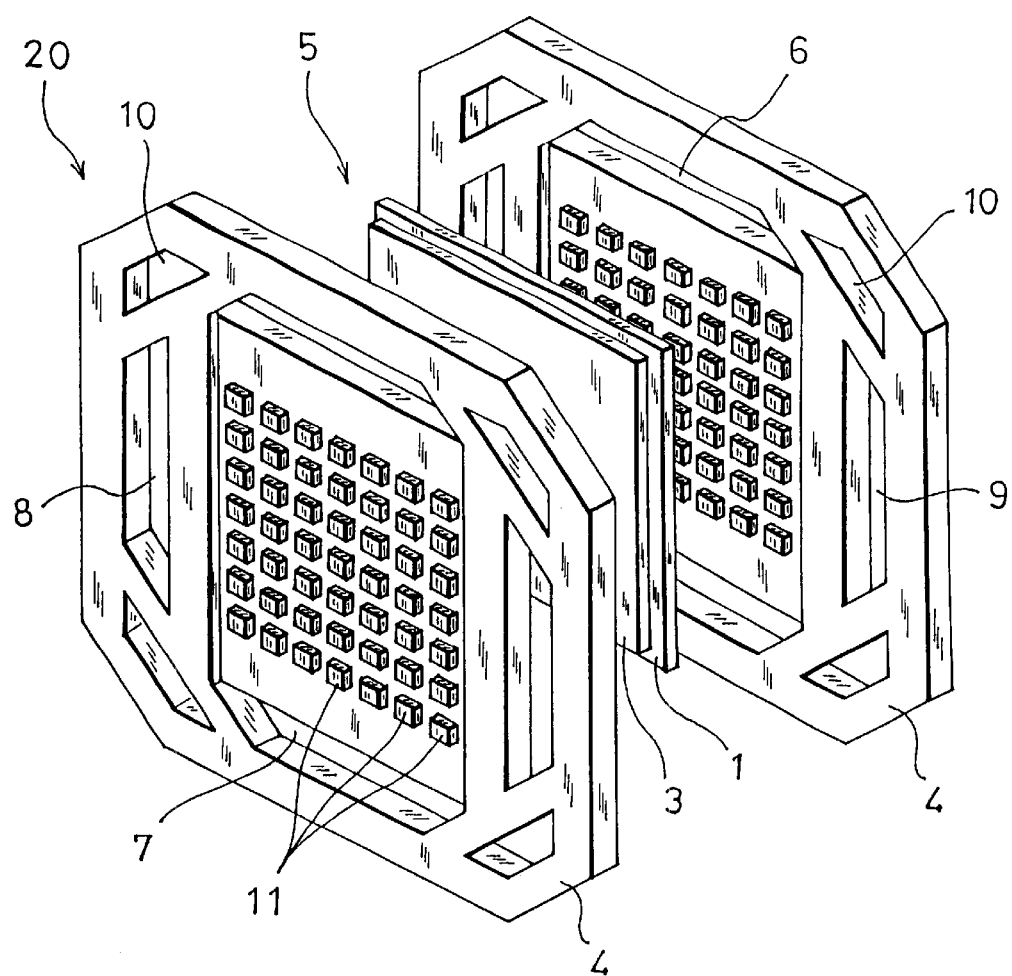
FIG. 1 is an exploded perspective view showing the configuration of a stack structure constituting a solid polymer electrolyte type fuel cell which has the separator of the invention.

First, the configuration and the operation of a solid polymer electrolyte type fuel cell having the separator of the invention will be briefly described with reference to FIGS. 1 to 3.

The solid polymer electrolyte type fuel cell 20 has a stack structure in which plural unit cells 5 are stacked and collector plates (not shown) are respectively placed on both ends. Each of the unit cells 5 is configured by: an electrolyte membrane 1 which is an ion exchange membrane made of, for example, a fluororesin; an anode 2 and a cathode 3 which are formed by carbon cloth woven of carbon filaments, carbon paper, or carbon felt, and which sandwich the electrolyte membrane 1 to constitute a gas diffusion electrode having a sandwich structure; and separators 4 which sandwich the sandwich structure.

Figure 2:
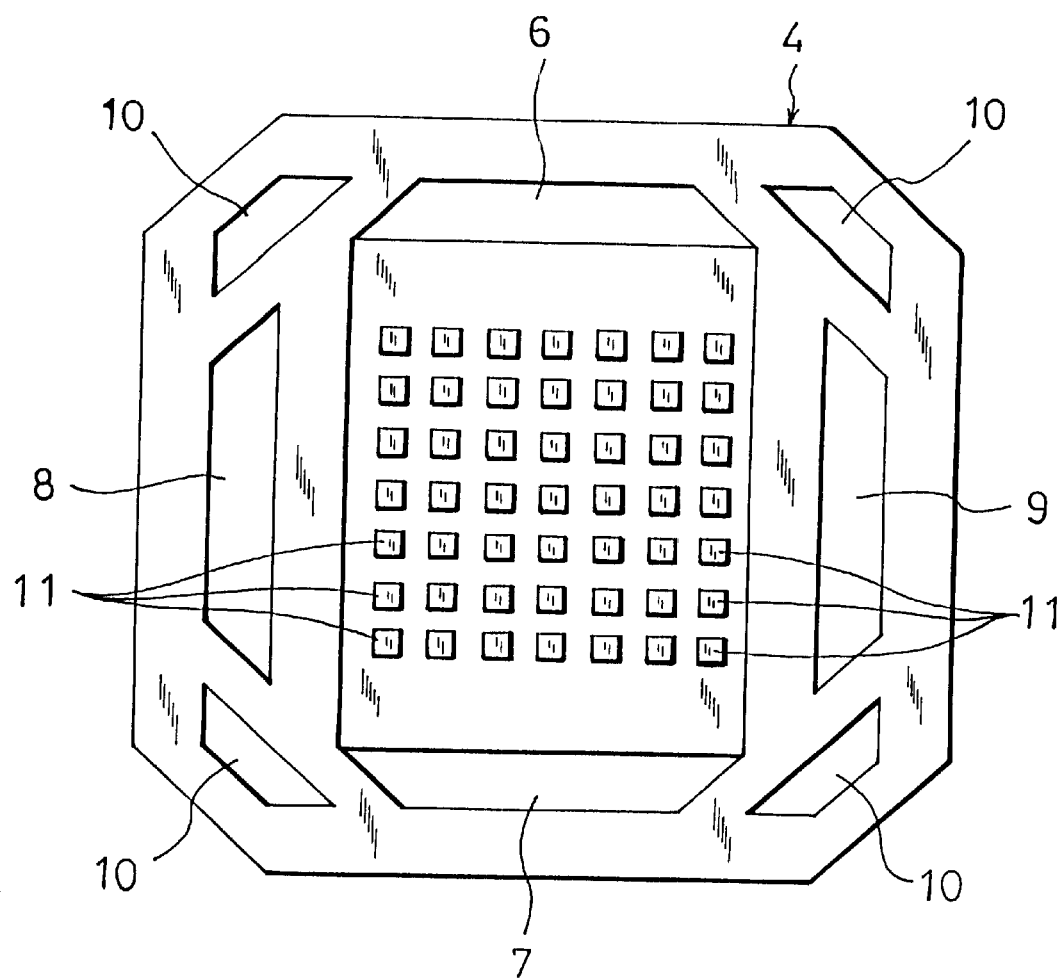
FIG. 2 is an external front view of the separator in the solid polymer electrolyte type fuel cell.

In each of the separators 4 on the sides, as shown in FIG. 2, fuel gas holes 6 and 7 for a fuel gas containing hydrogen, oxidant gas holes 8 and 9 for an oxidant gas containing oxygen, and a coolant water hole 10 are formed in the peripheral area. When plural unit cells 5 are stacked, the holes 6, 7, 8, 9, and 10 of the separators 4 of the unit cells constitute holes passing through the fuel cell 20 in the longitudinal direction to form a fuel gas supply manifold, a fuel gas discharge manifold, an oxidant gas supply manifold, an oxidant gas discharge manifold, and a coolant water passage, respectively.

Figure 3:
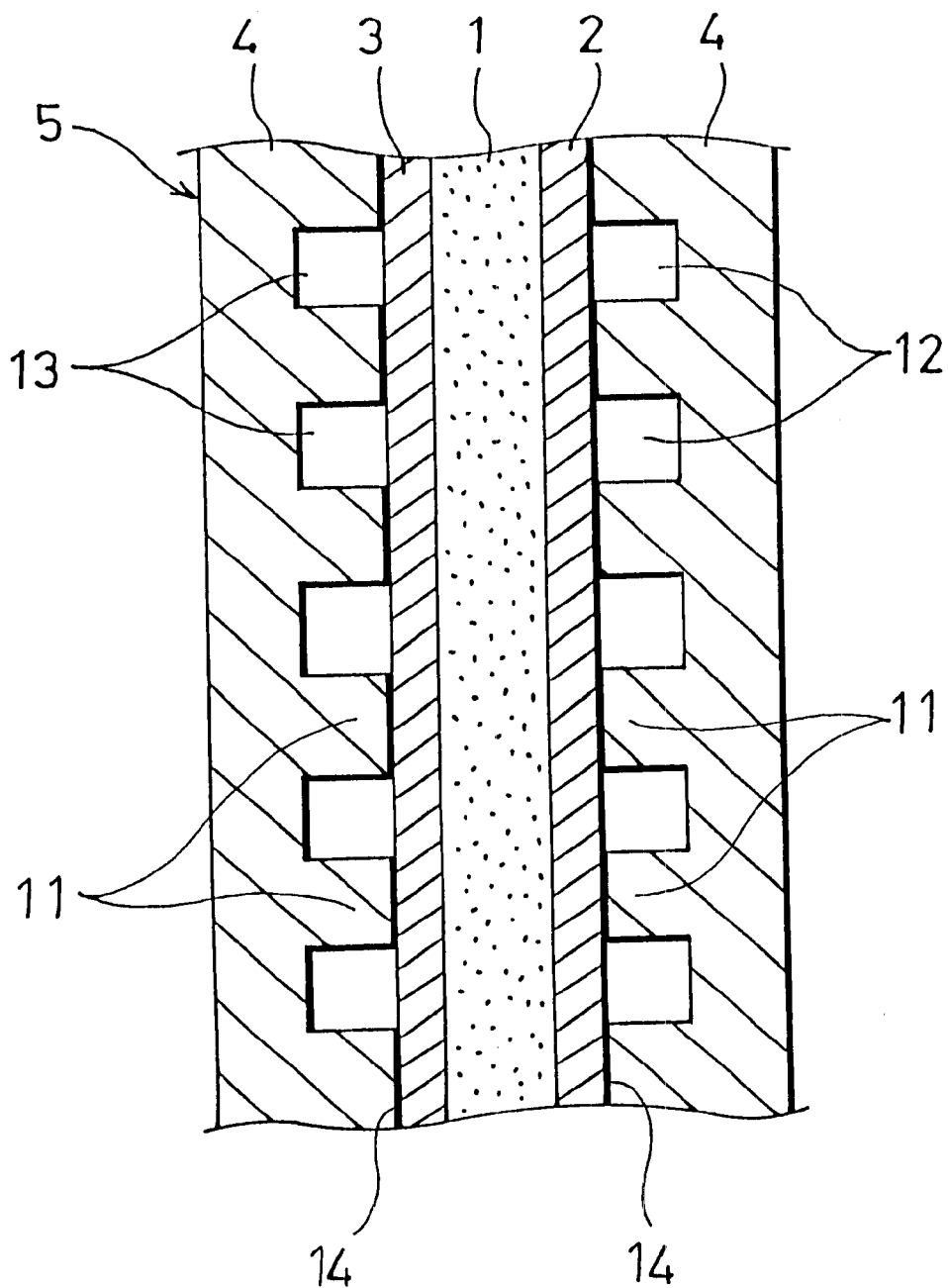
FIG. 3 is an enlarged section view of main portions showing the configuration of a unit cell which is a unit constituting the solid polymer electrolyte type fuel cell.

As shown in FIG. 3, a large number of ribs 11 having a predetermined shape are protrudingly formed on the surfaces of the separators 4 which sandwich the electrolyte membrane 1, the anode 2, and the cathode 3. Fuel gas passages 12 are formed between the ribs 11 of one of the separators 4 and the surface of the anode 2. Oxidant gas passages 13 are formed between the ribs 11 of the other separator 4 and the surface of the cathode 3.

In the solid polymer electrolyte type fuel cell 20 configured as a stack structure in which plural unit cells 5 are stacked and the collector plates are respectively placed on both the ends, the fuel gas which is supplied from an external fuel gas supplying device to the fuel cell 20, and which contains hydrogen is then supplied into the fuel gas passages 12 of each unit cell 5 via the fuel gas supply manifold to cause the electrochemical reaction indicated by formula (1) above, on the side of the anode 2 of the unit cell 5. After the reaction, the fuel gas is discharged to the outside via the fuel gas passages 12 of the unit cell 5 and the fuel gas discharge manifold. At the same time, the oxidant gas (air) which is supplied from an external oxidant gas supplying device to the fuel cell 20, and which contains oxygen is then supplied into the oxidant gas passages 13 of each unit cell 5 via the oxidant gas supply manifold to cause the electrochemical reaction indicated by formula (2) above, on the side of the cathode 3 of the unit cell 5. After the reaction, the oxidant gas is discharged to the outside via the oxidant gas passages 13 of the unit cell 5 and the oxidant gas discharge manifold.

In accordance with the electrochemical reactions of formulae (1) and (2) above, in the whole of the fuel cell 20, the electrochemical reaction indicated by the formula (3) proceeds, so that the chemical energy of the fuel is directly converted into electrical energy, with the result that the cell can exert a predetermined performance. Because of the characteristics of the electrolyte membrane 1, the fuel cell 20 is operated in a temperature range of about 80 to 100°C., and hence involves heat generation. During operation of the fuel cell 20, therefore, coolant water is supplied from an external coolant water supplying device to the fuel cell 20, and the coolant water is circulated through the coolant water passage, thereby preventing the temperature of the interior of the fuel cell 20 from being raised.

Each of the separators 4 in the solid polymer electrolyte type fuel cell 20 which is configured and operates as described above is configured in the following manner. The separator 4 is molded by using a complex (bondcarbon compound) in which the composition ratios are set to 60 to 90% of graphite powder, and 10 to 40% of phenol resin serving as a thermosetting resin. The graphite powder and the phenol resin are uniformly mixed with each other and adjusted to produce a compound. The compound is charged into a mold (not shown) having a predetermined shape. Under this state, the mold is heated and a surface pressure in the range of 300 to 1,000 kgf/cm$^2$ ($2.94 \times 10^7$ to $9.8 \times 10^7$ Pa) is applied to the mold by a pressing machine, thereby molding the separator 4 having the final shape which corresponds to the shape of the mold.

Figure 4:
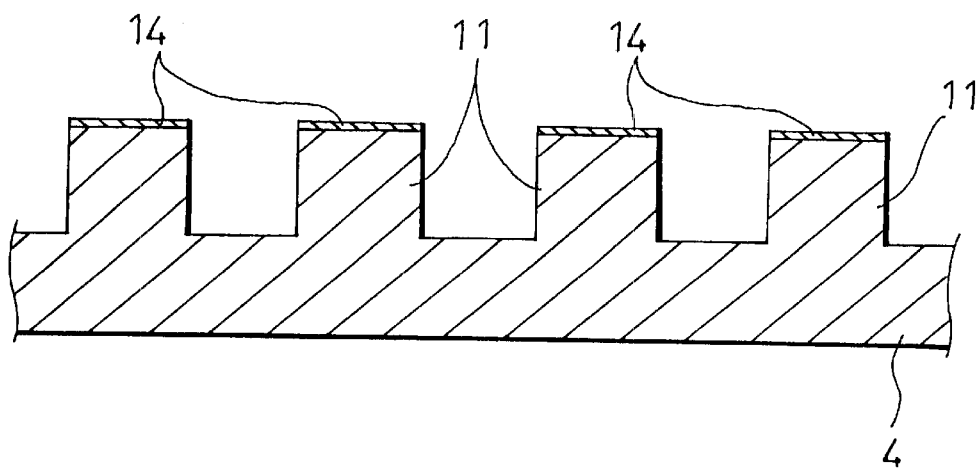
FIG. 4 is an enlarged section view of main portions of the separator.

In the thus molded separator 4, as shown in FIG. 4, a large number of ribs 11 are protrudingly formed on the surface of the separator 4 so as to be in contact with the surface of the anode 2 or the cathode 3. The top end face of each of the ribs is coated with a conductive film 14 made of a material having a specific resistance ($1 \times 10^{-3}$ to $1 \times 10^{-4}$ Ω·cm) which is lower than the specific resistance ($1 \times 10^{-1}$ to 1 Ω·cm) of the bondcarbon compound (complex).

Specifically, conductive graphite paste, gold paste, or silver paste is sprayed, vapor-deposited, printed, or applied to the top end faces of the ribs 11, and then dried, whereby the top end faces are coated with the conductive film 14 which has a thickness of 10 Ωm or smaller, preferably 3 Ωm or smaller, and in which the surface is smooth.

In the separator 4 which is configured as described above, with respect to the composition ratios of the bondcarbon compound constituting the separator 4, the content of the phenol resin is as large as 10 to 40%, and hence the bondcarbon compound exerts good elongation and fluidity during a molding process. While ensuring excellent moldability and productivity that a molded member (separator) of a desired shape can be surely obtained also by injection molding, the conductive film 14 which has a low specific resistance and high flatness accuracy is in contact with the surface of the anode 2 or the cathode 3. Therefore, the contacting portions between the separator 4, and the anode 2 or the cathode 3 have a very low electrical resistance. As a result, the conductivity of the separator 4 as a whole is improved so that the performance of the fuel cell can be improved.

In the embodiment described above, only the top end faces of the large number of ribs 11 which are protrudingly formed on the surface of the separator 4 are coated with the conductive film 14. Alternatively, the whole of the surface of the separator 4 may be coated with the conductive film.

In the embodiment described above, the large number of ribs 11 are scattered in the longitudinal and lateral directions on the surface of the separator 4. Alternatively, in a separator in which long ridge-like ribs are arranged in one of the longitudinal and lateral directions, only the top end faces of the long ridge-like ribs may be coated with the conductive film 14.

The entire disclosure of Japanese Patent Application No. 2000-002383 filed on Jan. 11, 2000 including specification, claims, drawings and summary are incorporated herein by reference in its entirety.

What is claimed is:

1. A separator for a fuel cell of an electrolyte type consisting of a complex which is configured by mixing graphite powder with a thermosetting resin, and having at least one rib defining an end face for contacting an electrode wherein in said complex, a composition ratio of said graphite powder is set to 60 to 90%, and a composition ratio of said thermosetting resin is set to 10 to 40%, and said at least one end face for contacting an electrode is coated with a conductive film made of conductive graphite paste, gold paste, or silver paste, which is lower in specific resistance than said complex.

2. A separator for a fuel cell according to claim 1, wherein a thickness of said conductive film is set to 10 $\mu$m or smaller.

3. A separator for a fuel cell according to claim 1, wherein a thickness of said conductive film is set to 3 $\mu$m or smaller.

4. A separator for a fuel cell according to claim 1, wherein, as means for performing coating of said conductive film, one of. means including spraying, vapor deposition, printing, and application, is employed.

5. A separator for a fuel cell according to claim 1, wherein said thermosetting resin comprises phenol resin.

6. A separator for a fuel cell according to claim 1, wherein said thermosetting resin comprises one selected from the group consisting of polycarbodiimide resin, epoxy resin, furfuryl alcohol resin, urea resin, melamine resin, unsaturated polyester resin, and alkyd resin.

7. A separator for a fuel cell according to claim 1, wherein said graphite powder comprises expanded graphite.

8. A separator for a fuel cell according to claim 1, wherein said graphite powder comprises one selected from the group consisting of natural graphite, artificial graphite, carbon black, and kish graphite.

* * * * *

UNITED STATES PATENT AND TRADEMARK OFFICE
CERTIFICATE OF CORRECTION

PATENT NO. : 6,468,685 B1 Page 1 of 1
DATED : October 22, 2002
INVENTOR(S) : Tsunemori Yoshida It is certified that error appears in the above-identified patent and that said Letters Patent is hereby corrected as shown below:

Column 6,
Line 44, "of." should be -- of: --.

Signed and Sealed this

First Day of April, 2003

JAMES E. ROGAN
*Director of the United States Patent and Trademark Office*